United States Patent [19]

Beyerl et al.

[11] 4,170,864
[45] Oct. 16, 1979

[54] APPARATUS FOR THE CONTINUOUS SPIRAL WINDING OF A TAPE ONTO AN ELONGATED BODY

[75] Inventors: Robert Beyerl; Richard Beyerl, both of Grangärde, Sweden

[73] Assignee: SHA, Torshällaverken, Torshalla, Sweden

[21] Appl. No.: 844,837

[22] Filed: Oct. 25, 1977

[51] Int. Cl.² .............................................. B65H 81/08
[52] U.S. Cl. .............................................. 57/3; 57/18; 57/19
[58] Field of Search ....................... 57/3, 6, 16, 17, 18, 57/19

[56] References Cited

U.S. PATENT DOCUMENTS

| | | | |
|---|---|---|---|
| 2,253,740 | 8/1941 | VanHook | 57/3 X |
| 3,138,913 | 6/1964 | Haugwitz | 57/19 X |
| 3,273,814 | 9/1966 | Prusak et al. | 57/3 X |
| 3,296,784 | 1/1967 | Guiton | 57/18 |

Primary Examiner—John Petrakes
Attorney, Agent, or Firm—Toren, McGeady and Stanger

[57] ABSTRACT

A method for continuously wrapping a tape spirally about an elongated body by passing the body longitudinally through the center of a rotating hollow circular spool while continuously feeding tape to the spool to create several wraps of the tape around the spool and then feeding the interior wrap of the tape through a slot in the spool onto the elongated body. An apparatus for carrying out the invention is also disclosed.

2 Claims, 3 Drawing Figures

APPARATUS FOR THE CONTINUOUS SPIRAL WINDING OF A TAPE ONTO AN ELONGATED BODY

BACKGROUND OF THE INVENTION

1. Field of the Invention

The present invention relates to a method for the continuous spooling or winding of a tape in a spiral fashion onto an elongated body, such as, a pipe or wire.

2. Description of the Prior Art

The spiral winding of various types of tape material, such as, insulators and the like, about elongated bodies, such as, tubes, pipes, electrical wires, etc., is widely used in industry. Typically, for example, insulating material in the form of a tape is spooled onto wires for electrical transformers, cables in order to insulate the cables, as well as for the thermal insulation of pipes used in heating.

One of the major disadvantages of the processes currently used for this type of spooling or winding is that the processes are relatively slow and it has been proven difficult to increase the speeds of the presently known processes. Attempts to increase the spooling speeds have resulted in breaking or tearing of the tape and consequently, the industry has encountered a limit in its ability to increase the spooling capacity. Typically, for example, with such processes, only about 800 or so rounds per minute can generally be accomplished.

Also, of course, depending on the outer peripheral shape of the body on which the tape is to be wound, difficulties arise because of variations in the tape tension which, in turn, results in tearing and breaking of the tape.

SUMMARY OF THE INVENTION

Applicants have discovered a method for continuously spooling a tape onto an elongated body, such as, a wire, filament or pipe in a continuous manner by passing the body through the centerpoint of a hollow circular spool while simultaneously rotating the spool about the body and feeding a tape onto the spool to create several overlapping wraps about the spool and feeding the interior winding of said overlapping winds through a slot in the spool to the interior thereof whereby it is spirally wrapped about the elongated body as it passes through the interior of the spool.

As a result of this process, it has become possible to substantially increase the spooling or winding speed without incurring breaking or tearing of the tape. Typically, for example, it is possible with the present process to achieve 1600 rounds per minute without breaking or tearing of the tape.

Applicants have further invented an apparatus for performing this method which comprises a hollow circular spool having at least one slot therein for passage of the tape therethrough, means for continuously passing the elongated body through the interior of the spool; means for rotating the spool and means for continuously feeding tape to the spool for wrapping therearound and for feeding the interior wrap through the slot for winding about the elongated body.

Additionally, in certain preferred aspects of the apparatus, the spool has means for decreasing the circumference thereof, such that if a break does occur, the circumference of the spool can be decreased, thereby making it possible to more easily remove the interior winding of the tape thereon. Applicants have also devised means for compensating for changes in the tension of the tape during the feeding in order to further minimize breaking of the tape.

DESCRIPTION OF THE PREFERRED EMBODIMENTS

Figure 1:
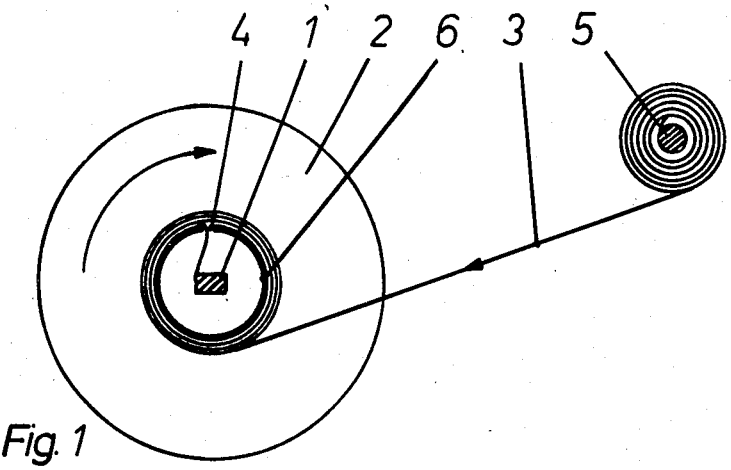
FIG. 1 is schematic diagram of the manner of carrying out the method of the present invention.

Referring to the drawings and particularly to FIG. 1, in the method of the present invention, tape 3 is fed from a feeding spool 5 and is wrapped about a hollow circular spool. The outer flange of the spool is designated as 2 in FIG. 1 and 6 designates the central portion of the spool which is actually the hollow cylindrical member.

Through the center of cylindrical spool or member 6 is passed the longitudinal body to be wrapped. In the drawing it is shown to be a rectangular shaped body, although, of course, the body may have a variety of different types of cross-sectional areas.

The spool is rotated in the direction shown by the arrow and several windings of tape 3 are wound thereabout. Spool 6 also has at least one slot therein through which the tape is fed to come into contact and to be attached to the elongated body 1. The process is thus carried out by continuously rotating cylindrical body 6 while simultaneously passing the elongated body longitudinally through the center thereof, such that tape is continually fed onto spool 6 and by virtue of the rotation of slot 4 about body 1, the tape is spirally wound around the body.

The tapes utilized may be of a variety of different materials, e.g., paper, plastic, and the like. Due to the irregularities in such materials as well as the differing or irregular cross-sectional areas of the elongated body 1, breaks may occur in the tape.

Figure 2:
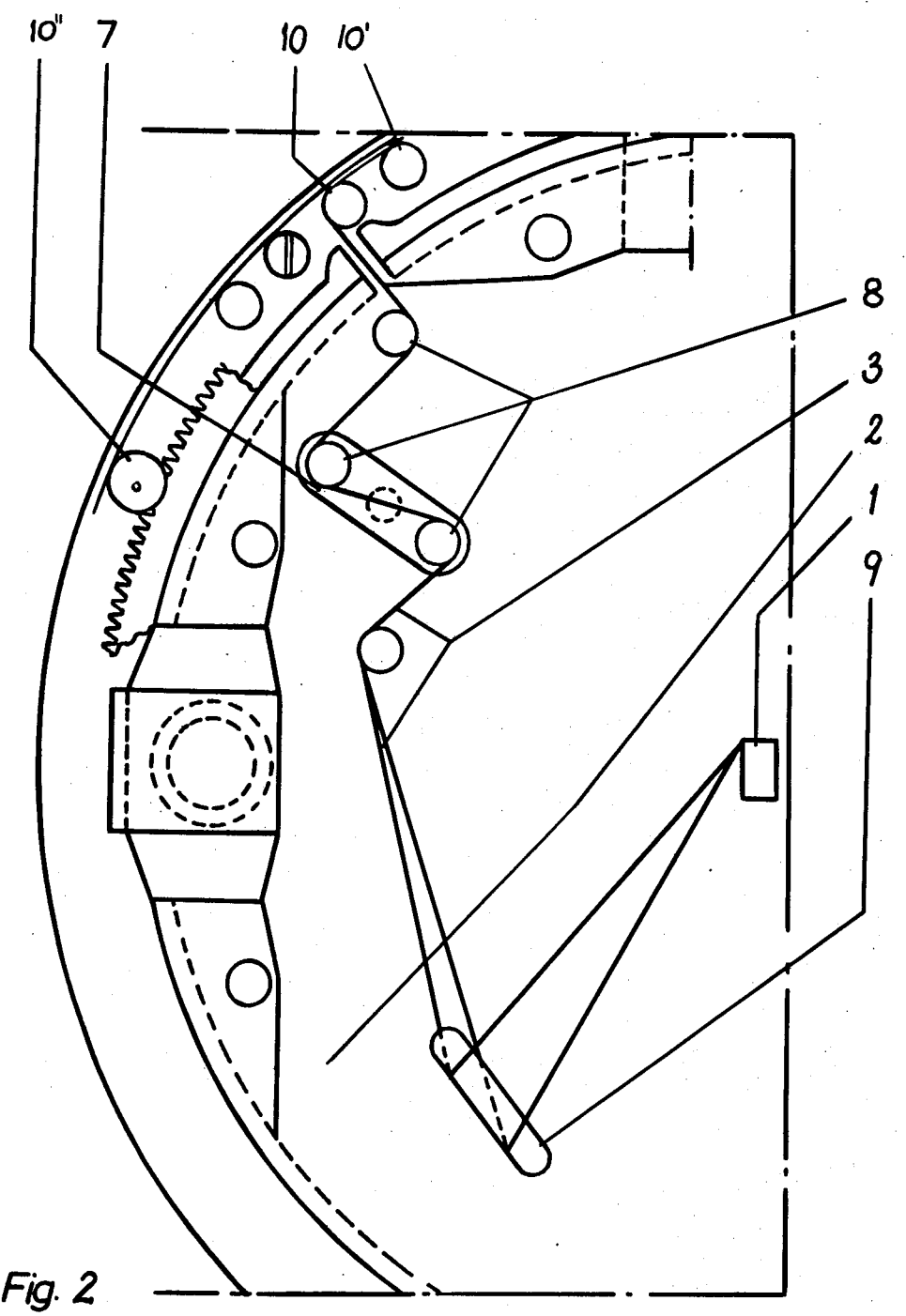
FIG. 2 is a cross-section of a hollow spool in accordance with the present invention.

Referring now to FIG. 2, a preferred embodiment is shown wherein it is possible to compensate for the tension of the tape and thereby reduce the number of tape breaks.

In FIG. 2, it is noted that the actual surface of the hollow cylindrical body designated as 6 in FIG. 1, may be composed of a series of rolls shown as 10, 10' and 10". The series of rolls generate a circular surface which accomplishes the same effect as if the outer periphery of the cylindrical body were a single surface.

Shown in the embodiment of FIG. 2, is a spring loaded device 7 which serves as a compensating member to react to changes in the tension of tape 3. It is noted, in this regard, that the driving means for feed roll 5 as well as spool 2 are not shown but are merely conventional means well known in the art. Specifically, the tension compensating means may be a lever being rotatable about an axis parallel to the axis of rotation of the hollow spool, the lever carrying rollers for guiding the tape between the opening and the elongated body wherein the tension of the tape rotates the lever in a first direction, and a spring means acting upon the lever to rotate the lever in a direction opposite to the first direction.

As shown in FIG. 2, the tape is fed between the space in the rollers which constitute the surface of spool 6 and is fed around rolls 8 which are attached to compensating member 7. The tape is then fed to a deflecting member 9 which results in essentially an angular turn of the tape so that it can then be fed onto elongated body 1.

Compensating body 7 may be spring-loaded so as to adjust the tension of the tape as the particular point of winding of the tape onto body 1 occurs.

Figure 3:
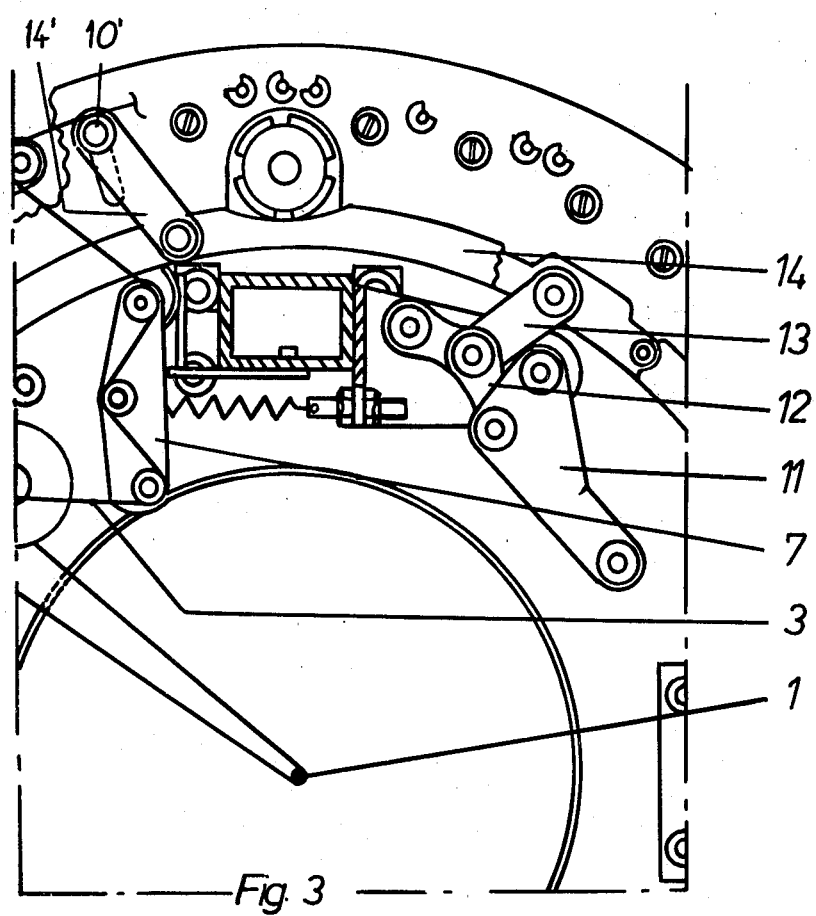
FIG. 3 is a cross-section in detail of a spool in accordance with the present invention.

Referring to FIG. 3, the axes of the rolls 10, located at the generating surface 6, are arranged so as to be slidable to facilitate catching of the end of the tape when it breaks. This is achieved with the aid of lever arms 11, 12 and 13. When lever arm 11 is pressed radially, the lever arm 13 which is connected to lever arm 11 through lever arm 12 is also pulled radially. The other end of lever arm 13 is attached to a peripheral part 14 on spool 2 which carries a number of axes for rolls 10' which are connected with part 14 through arms 14'. When this peripheral part is moved concentrically which is achieved by pressing lever arm 11 radially to the inside, the operating radius of rolls 10' on spool 2 is changed so that rolls 10' do not cling to tape 3. This makes it easy to grasp the end of the tape and to lash or connect the tape end. The spooling operation then continues.

The arrangement of a roll 10" shown in FIG. 2 which is supported eccentrically and can be rotated by a gear wheel also facilitates changing the tension of the tape.

In the present method, tape 3 is guided from the delivery spool 5 through a slot 4 which slot 4 consists of the spaces between the rolls 10; from slot 4, the tape 3 is guided to filamentary body 1; the tape 3 is then wound onto rolls 10 on spool 2 and thence onto the filamentary body since spool 2 is being rotated.

In another embodiment of the present invention, it is possible to operate the present process continuously when the tape from the feed roll 5 runs out. In this event, one uses two or more spools 2 positioned one after the other so that the elongated body 1 may pass through the center of each of the spools. When the delivery of tape to the first spool is interrupted, the tape can be inserted into the second spool, wound thereon and continuously fed to the elongated body thereby avoiding an interruption in the continuity of the winding about the body.

Owing to the arrangement of the slot 4 as well as the rolls 10 which are slidable radially, it is possible to spool the tape onto the elongated filamentary body from the inside from the spooling of the tape on the spool.

Thus, in the apparatus according to the invention, the spooling speed has been significantly increased in relation to prior known spooling machines. The speed of approximately 1600 rounds per minute according to the present invention is more than twice as high as in prior known machines.

Both advantages mentioned last, taken in combination, mean that the machine and the method according to the invention are extremely advantageous. This has been achieved mainly by guiding the tape during spooling in a new manner, namely by arranging the slot 4 on the area of contact 6 of spool 2 and under the tape 3 spooled onto spool 2.

What is claimed is:

1. An apparatus for continuously winding a tape about an elongated body comprising a series of rolls defining a circular spool having a cylindrical surface, having at least one opening in its periphery, means for passing said elongated body through the center of the spool, means for continuously rotating the hollow circular spool, means for feeding a tape to said hollow circular spool to form several convolutions of the tape on the spool, means for unwinding the tape from the spool and passing the tape through the opening onto the elongated body, tension compensating means for acting upon the tape when passing between the opening and the elongated body, and tapebreaking avoidance means actuated by the tension compensating means for moving the rolls radially inward of said spool when the tension of the tape decreases suddenly due to breakage, thereby decreasing the circumference of said spool to facilitate catching of the broken end of the tape and retrieval thereof.

2. An apparatus as claimed in claim 1 in which said tension compensating means comprises a lever being rotatable about an axis parallel to the axis of rotation of said hollow spool, said lever carrying rollers for guiding said tape between said opening and said elongated body, the tension of the tape striving to rotate said lever in a first direction, a spring means acting upon said lever striving to rotate the lever in a direction opposite to said first direction.

* * * * *